US010100722B2

United States Patent
Nishio et al.

(10) Patent No.: US 10,100,722 B2
(45) Date of Patent: Oct. 16, 2018

(54) METHOD OF CONTROLLING TURBOCHARGED ENGINE AND CONTROL DEVICE OF TURBOCHARGED ENGINE

(71) Applicant: Mazda Motor Corporation, Aki-gun, Hiroshima (JP)

(72) Inventors: Takafumi Nishio, Otake (JP); Masayoshi Higashio, Hiroshima (JP); Yugou Sunagare, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 77 days.

(21) Appl. No.: 15/129,583

(22) PCT Filed: Feb. 6, 2015

(86) PCT No.: PCT/JP2015/000567
§ 371 (c)(1),
(2) Date: Sep. 27, 2016

(87) PCT Pub. No.: WO2015/145942
PCT Pub. Date: Oct. 1, 2015

(65) Prior Publication Data
US 2017/0145907 A1    May 25, 2017

(30) Foreign Application Priority Data

Mar. 28, 2014 (JP) .................... 2014-069556

(51) Int. Cl.
| F02B 37/16 | (2006.01) |
|---|---|
| F02D 41/00 | (2006.01) |
| F02D 41/14 | (2006.01) |
| F02B 37/12 | (2006.01) |

(52) U.S. Cl.
CPC .......... F02B 37/16 (2013.01); F02D 41/0007 (2013.01); F02D 41/1401 (2013.01);
(Continued)

(58) Field of Classification Search
CPC ................ F02B 37/16; F02B 2037/125; F02D 41/0007; F02D 41/1401; F02D 2041/1412; F02D 2200/602
(Continued)

(56) References Cited

U.S. PATENT DOCUMENTS 9,464,586 B2 * 10/2016 Maekawa ........... F02D 41/0225
2010/0236520 A1    9/2010 Ito
(Continued)

FOREIGN PATENT DOCUMENTS

| CN | 101542109 A | 9/2009 |
|---|---|---|
| JP | 2003097298 A | 4/2003 |

(Continued)

OTHER PUBLICATIONS

ISA Japan Patent Office, International Search Report Issued in Application No. PCT/JP2015/000567, dated May 12, 2015, WIPO, 4 pages.
(Continued)

Primary Examiner — Hoang Nguyen
(74) Attorney, Agent, or Firm — Alleman Hall Creasman & Tuttle LLP

(57) ABSTRACT

A control method of a turbocharged engine includes: a bypass passage bypassing a compressor; and a bypass valve configured to open and close the bypass passage. The method includes: a compressor flow rate predicting step of predicting a flow rate of air flowing through the compressor after a predetermined time; a compressor pressure ratio detecting step of detecting a pressure ratio of the compressor; a surging determining step of determining whether or not surging occurs after the predetermined time, in reference to preliminary prepared surging determination data based on the compressor predicted flow rate and the compressor pressure ratio; and a bypass valve controlling step of open-
(Continued)

ing the bypass valve when it is determined in the surging determining step that the surging occurs and closing the bypass valve when it is determined in the surging determining step that the surging does not occur.

3 Claims, 10 Drawing Sheets

(52) U.S. Cl.
 CPC *F02B 2037/125* (2013.01); *F02D 2041/1412* (2013.01); *F02D 2200/602* (2013.01)
(58) Field of Classification Search
 USPC .................................. 60/602, 605.1, 605.2
 See application file for complete search history.

(56) References Cited

U.S. PATENT DOCUMENTS

| | | | |
|---|---|---|---|
| 2012/0000197 A1* | 1/2012 | Maruyama | F02D 41/0057 60/605.2 |
| 2012/0191321 A1* | 7/2012 | Ibuki | F02B 37/004 701/102 |
| 2015/0135706 A1* | 5/2015 | Takao | F02B 37/18 60/602 |
| 2016/0363043 A1* | 12/2016 | Hirayama | F02D 41/10 |

FOREIGN PATENT DOCUMENTS

| | | |
|---|---|---|
| JP | 2006207506 A | 8/2006 |
| JP | 2010038077 A | 2/2010 |
| JP | 2010059794 A | 3/2010 |
| JP | 2010174710 A | 8/2010 |

OTHER PUBLICATIONS

IPEA Japan Patent Office, International Preliminary Report on Patentability Issued in Application No. PCT/JP2015/000567, dated Oct. 6, 2016, WIPO, 15 pages.

* cited by examiner

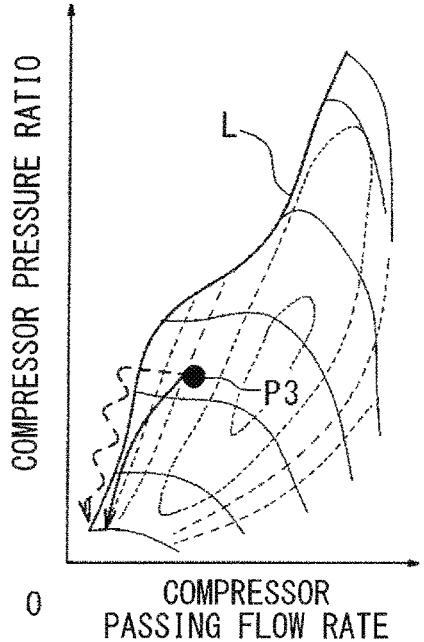
Fig. 5A
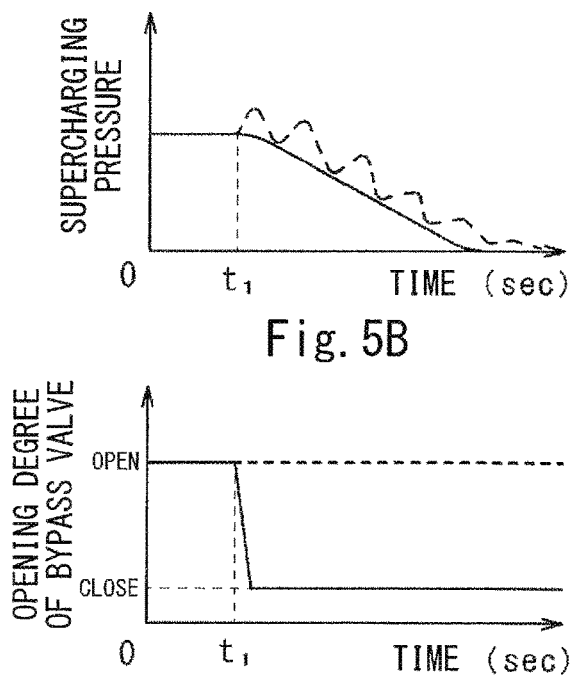
Fig. 5B
Fig. 5C
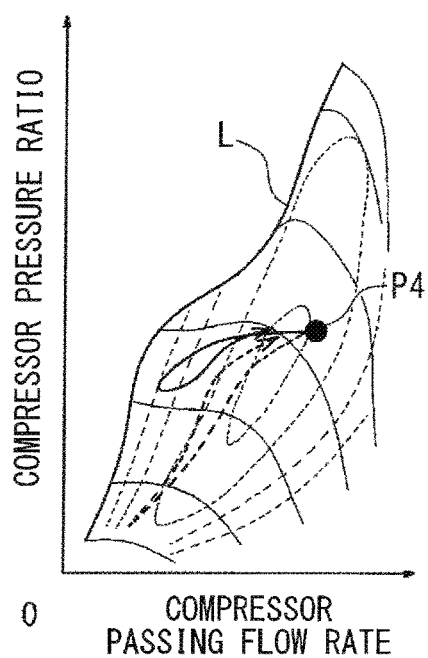
Fig. 6A
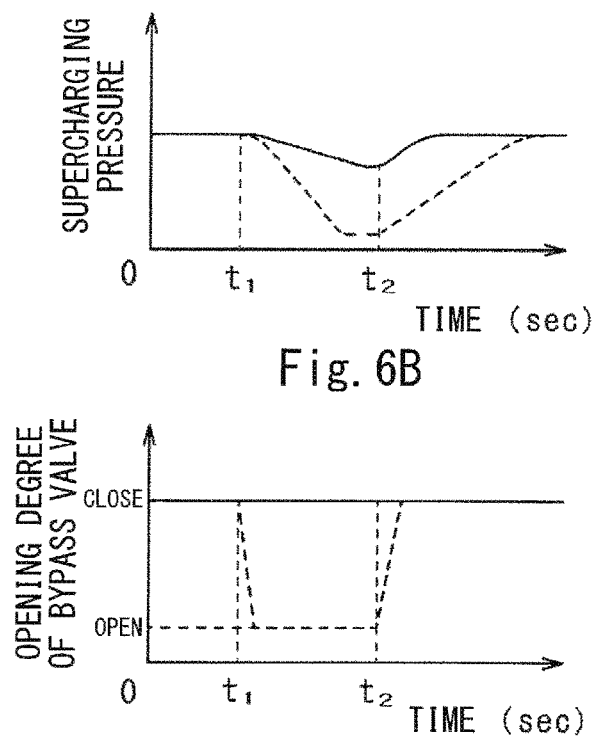
Fig. 6B
Fig. 6C

METHOD OF CONTROLLING TURBOCHARGED ENGINE AND CONTROL DEVICE OF TURBOCHARGED ENGINE

TECHNICAL FIELD

The present invention relates to a method of controlling a turbocharged engine and a control device of the turbocharged engine, and particularly to a method of controlling a turbocharged engine in which an intake passage is provided with a bypass passage that bypasses a compressor, and a control device of the turbocharged engine.

BACKGROUND ART

In a turbocharged engine, a turbine is disposed on an exhaust passage, and a compressor is disposed on an intake passage. The turbine is rotated by an exhaust flow discharged from a combustion chamber of the engine. With this, the compressor directly coupled to the turbine is rotated, and this increases the amount of air supplied to the combustion chamber. A problem in this type of turbocharger is that so-called surging tends to occur especially at the time of deceleration.

FIG. 13 is a compressor map showing a range where the compressor can perform supercharging. The compressor map includes a surging line L, and a region located at a low flow rate side of the surging line L is a surging region. When an operating point P0 plotted by a compressor passing flow rate and a pressure ratio between a pressure upstream of the compressor and a pressure downstream of the compressor (hereinafter referred to as a "compressor pressure ratio") is located in the surging region, surging occurs, that is, an intake flow vibrates in upstream and downstream directions of the intake passage with the generation of noises.

For example, when a throttle valve disposed on the intake passage is closed at the time of the deceleration, the exhaust flow supplied to the turbine decreases. However, since the turbine continues to rotate by inertial force for a while, the compressor coupled to the turbine also continues supercharging. As a result, supercharged air ejected from the compressor toward a downstream side is stopped by the throttle valve, so that the pressure between the compressor and the throttle valve is maintained for a while. In contrast, the compressor passing flow rate decreases since the throttle valve is closed.

To be specific, the compressor pressure ratio is maintained high, whereas the compressor passing flow rate decreases. In this case, the operating point of the compressor tends to move to the surging region, and the surging occurs.

To suppress the surging, it is known that: the intake passage is provided with a bypass passage that connects a portion of the intake passage which portion is located upstream of the compressor and a portion of the intake passage which portion is located downstream of the compressor; and a bypass valve configured to open and close the bypass passage is provided. For example, PTL 1 discloses that the surging is suppressed in such a manner that by opening the bypass valve at the time of the deceleration, that is, by opening the bypass valve when the throttle valve is closed, the pressure between the compressor and the throttle valve is released through the bypass passage to an upstream side of the compressor, and this decreases the compressor pressure ratio.

The bypass valve of PTL 1 is opened when the pressure downstream of the throttle valve becomes a negative pressure. To be specific, when the throttle valve is closed, such as at the time of the deceleration, the bypass valve is opened.

CITATION LIST

Patent Literature

PTL 1: Japanese Laid-Open Patent Application Publication No. 2003-097298

SUMMARY OF INVENTION

Technical Problem

There are cases where the surging does not occur even when the bypass valve is not opened at the time of the deceleration. For example, when the operating point, such as an operating point P1 in FIG. 13, is located adequately away from the surging line L toward a high flow rate side, there are cases where the operating point does not reach the surging region. This is because during the decrease in the compressor passing flow rate after the deceleration, the inertial force of the turbine decreases, and therefore, the compressor pressure ratio decreases.

Further, even when the operating point, such as an operating point P2, is not located adequately away from the surging line L toward the high flow rate side, the operating point does not reach the surging region without opening the bypass valve by performing reacceleration before the operating point reaches the surging region after the deceleration.

To be specific, if the bypass valve is opened at every time of deceleration in the above case, the supercharging pressure between the compressor and the throttle valve drops, so that a time is required to increase the dropped supercharging pressure at the time of reacceleration, and this deteriorates an acceleration response.

The present invention was made to solve the above problem, and an object of the present invention is to obtain a method of controlling a turbocharged engine and a control device of the turbocharged engine, the method and the control device being capable of improving an acceleration response while preventing surging.

Solution to Problem

To solve the above problem, the present invention was configured as below.

A first aspect of the present invention is a method of controlling a turbocharged engine, the turbocharged engine including: a turbocharger including a compressor disposed on an intake passage; a bypass passage connecting a portion of the intake passage which portion is located upstream of the compressor and a portion of the intake passage which portion is located downstream of the compressor; and a bypass valve disposed on the bypass passage and configured to open and close the bypass passage, the method including: a compressor flow rate predicting step of predicting a flow rate of air flowing through the compressor after a predetermined time; a compressor pressure ratio detecting step of detecting a pressure ratio between a pressure upstream of the compressor and a pressure downstream of the compressor; a surging determining step of determining whether or not surging occurs after the predetermined time, in reference to preliminary prepared surging determination data based on a compressor predicted flow rate that is the flow rate predicted in the compressor flow rate predicting step and a compressor pressure ratio that is the pressure ratio detected in the compressor pressure ratio detecting step; and a bypass valve controlling step of opening the bypass valve when it is determined in the surging determining step that the surging occurs and closing the bypass valve when it is determined in the surging determining step that the surging does not occur.

A second aspect of the present invention is configured such that: in the first aspect of the present invention, the compressor flow rate predicting step includes a throttle valve opening degree predicting step of predicting an opening degree of a throttle valve after the predetermined time, from a target opening degree of the throttle valve which degree is set in accordance with an acceleration request from a driver, a throttle valve upstream/downstream pressure predicting step of predicting a pressure upstream of the throttle valve after the predetermined time and a pressure downstream of the throttle valve after the predetermined time, and a throttle valve flow rate predicting step of predicting the flow rate of the air flowing through the throttle valve after the predetermined time, based on a throttle valve predicted opening degree that is the opening degree predicted in the throttle valve opening degree predicting step and throttle valve upstream/downstream predicted pressures that are the pressures predicted in the throttle valve upstream/downstream pressure predicting step; and a throttle valve predicted flow rate that is the flow rate predicted in the throttle valve flow rate predicting step is regarded as the compressor predicted flow rate.

A third aspect of the present invention is configured such that: in the first aspect of the present invention, the compressor flow rate predicting step includes a throttle valve target flow rate calculating step of calculating a target flow rate of the air flowing through a throttle valve, from a target torque set in accordance with an acceleration request from a driver; and a throttle valve target flow rate that is the target flow rate calculated in the throttle valve target flow rate calculating step is regarded as the compressor predicted flow rate.

A fourth aspect of the present invention is a method of controlling a turbocharged engine, the turbocharged engine including: a turbocharger including a compressor disposed on an intake passage; a bypass passage connecting a portion of the intake passage which portion is located upstream of the compressor and a portion of the intake passage which portion is located downstream of the compressor; and a bypass valve disposed on the bypass passage and configured to open and close the bypass passage, the method including: a compressor flow rate detecting step of detecting a flow rate of air flowing through the compressor; a compressor pressure ratio detecting step of detecting a pressure ratio between a pressure upstream of the compressor and a pressure downstream of the compressor; a flow rate change amount calculating step of calculating a change amount of a compressor flow rate that is the flow rate detected in the compressor flow rate detecting step; a surge margin calculating step of calculating a surge margin in reference to preliminary prepared surging determination data based on the compressor flow rate and a compressor pressure ratio that is the pressure ratio detected in the compressor pressure ratio detecting step; a surging determining step of determining whether or not surging occurs after a predetermined time, based on a compressor flow rate change amount that is the change amount calculated in the flow rate change amount calculating step and the surge margin calculated in the surge margin calculating step; and a bypass valve controlling step of opening the bypass valve when it is determined in the surging determining step that the surging occurs and closing the bypass valve when it is determined in the surging determining step that the surging does not occur.

A fifth aspect of the present invention is configured such that in the fourth aspect of the present invention, when the compressor flow rate change amount exceeds a flow rate change amount threshold that is set so as to increase as the surge margin increases, it is determined in the surging determining step that the surging occurs.

A sixth aspect of the present invention is a control device of a turbocharged engine, the turbocharged engine including: a turbocharger including a compressor disposed on an intake passage; a bypass passage connecting a portion of the intake passage which portion is located upstream of the compressor and a portion of the intake passage which portion is located downstream of the compressor; and a bypass valve disposed on the bypass passage and configured to open and close the bypass passage, the control device including: a throttle valve opening degree predicting portion configured to predict an opening degree of a throttle valve after a predetermined time, from a target opening degree of the throttle valve which degree is set in accordance with an acceleration request from a driver; a throttle valve upstream/ downstream pressure predicting portion configured to predict a pressure upstream of the throttle valve after the predetermined time and a pressure downstream of the throttle valve after the predetermined time; a throttle valve flow rate predicting portion configured to predict the flow rate of the air flowing through the throttle valve after the predetermined time, based on a throttle valve predicted opening degree that is the opening degree predicted by the throttle valve opening degree predicting portion and throttle valve upstream/downstream predicted pressures that are the pressures predicted by the throttle valve upstream/downstream pressure predicting portion; a compressor flow rate predicting portion configured to regard a throttle valve predicted flow rate, which is the flow rate predicted by the throttle valve flow rate predicting portion, as the flow rate of the air flowing through the compressor; a compressor pressure ratio detecting portion configured to detect a pressure ratio between a pressure upstream of the compressor and a pressure downstream of the compressor; a surging determining portion configured to determine whether or not surging occurs after the predetermined time, in reference to preliminary prepared surging determination data based on a compressor predicted flow rate that is the flow rate predicted by the compressor flow rate predicting portion and a compressor pressure ratio that is the pressure ratio detected by the compressor pressure ratio detecting portion; and a bypass valve control portion configured to open the bypass valve when the surging determining portion determines that the surging occurs and close the bypass valve when the surging determining portion determines that the surging does not occur.

A seventh aspect of the present invention is a control device of a turbocharged engine, the turbocharged engine including: a turbocharger including a compressor disposed on an intake passage; a bypass passage connecting a portion of the intake passage which portion is located upstream of the compressor and a portion of the intake passage which portion is located downstream of the compressor; and a bypass valve disposed on the bypass passage and configured to open and close the bypass passage, the control device including: a throttle valve target flow rate calculating portion configured to calculate a target flow rate of air flowing through a throttle valve, from a target torque set in accordance with an acceleration request from a driver; a compressor flow rate predicting portion configured to regard a throttle valve target flow rate, which is the target flow rate calculated by the throttle valve target flow rate calculating portion, as the flow rate of the air flowing through the compressor after a predetermined time; a compressor pressure ratio detecting portion configured to detect a pressure ratio between a pressure upstream of the compressor and a pressure downstream of the compressor; a surging determining portion configured to determine whether or not surging occurs after the predetermined time, in reference to preliminary prepared surging determination data based on a compressor predicted flow rate that is the flow rate predicted by the compressor flow rate predicting portion and a compressor pressure ratio that is the pressure ratio detected by the compressor pressure ratio detecting portion; and a bypass valve control portion configured to open the bypass valve when the surging determining portion determines that the surging occurs and close the bypass valve when the surging determining portion determines that the surging does not occur.

An eighth aspect of the present invention is a control device of a turbocharged engine, the turbocharged engine including: a turbocharger including a compressor disposed on an intake passage; a bypass passage connecting a portion of the intake passage which portion is located upstream of the compressor and a portion of the intake passage which portion is located downstream of the compressor; and a bypass valve disposed on the bypass passage and configured to open and close the bypass passage, the control device including: a compressor flow rate detecting portion configured to detect a flow rate of air flowing through the compressor; a compressor pressure ratio detecting portion configured to detect a pressure ratio between a pressure upstream of the compressor and a pressure downstream of the compressor; a flow rate change amount calculating portion configured to calculate a change amount of a compressor detected flow rate that is the flow rate detected by the compressor flow rate detecting portion; a surge margin calculating portion configured to calculate a surge margin with respect to preliminary prepared surging determination data based on the compressor detected flow rate and the pressure ratio; a surging determining portion configured to determine whether or not surging occurs after a predetermined time, based on a compressor flow rate change amount that is the change amount calculated by the flow rate change amount calculating portion and the surge margin calculated by the surge margin calculating portion; and a bypass valve control portion configured to open the bypass valve when the surging determining portion determines that the surging occurs and close the bypass valve when the surging determining portion determines that the surging does not occur.

Advantageous Effects of Invention

According to the above aspects of the present invention, the following effects can be obtained by the above configurations.

According to the first aspect of the present invention, whether or not the surging occurs after the predetermined time can be easily determined from the compressor predicted flow rate after the predetermined time and the compressor pressure ratio at present. Since the compressor pressure ratio is maintained by the inertial force of the turbine for a while even at the time of the deceleration, the surging determination after the predetermined time can be performed by using the compressor pressure ratio at present. With this, while preventing the surging, unnecessary opening of the bypass valve is prevented, and the supercharging pressure is easily maintained. To be specific, both preventing the surging and improving the acceleration response can be realized.

According to the second aspect of the present invention, the compressor predicted flow rate after the predetermined time can be easily predicted from the throttle valve predicted opening degree and the throttle valve upstream/downstream predicted pressures.

For example, as the throttle valve predicted opening degree, an actual opening degree is predicted from the target opening degree, set based on the acceleration request from the driver, in reference to preliminary prepared dynamic characteristic data of the throttle valve. The pressure upstream of the throttle valve is predicted from a pressure upstream of the throttle valve at present and detected by a pressure sensor. The pressure downstream of the throttle valve is predicted from the operation state at present in reference to a preliminary prepared volume efficiency predicting map.

According to the third aspect of the present invention, the compressor predicted flow rate after the predetermined time can be easily predicted from the throttle valve target flow rate calculated based on the acceleration request from the driver. To be specific, in consideration of actual operation delays of the throttle valve and the like, the throttle valve target flow rate can be regarded as the throttle valve flow rate after a time corresponding to the operation delays. With this, an operating point of the compressor after the predetermined time can be predicted with a high degree of accuracy, so that the surging determination after the predetermined time can be suitably performed.

For example, to realize an output of the target torque for obtaining a requested acceleration calculated from the acceleration request from the driver, the throttle valve target flow rate is calculated from various driving parameters (such as a cylinder average effective pressure, a heat efficiency, the amount of heat generated, and a filling efficiency).

According to the fourth aspect of the present invention, without utilizing the compressor predicted flow rate, the surging determination can be performed based on the surge margin and the compressor flow rate change amount which are calculated from the operation state of the compressor at present.

According to the fifth aspect of the present invention, the flow rate change amount threshold is set so as to increase as the surge margin increases, so that when the surge margin is large, it is hardly determined that the surging occurs. Thus, unnecessary opening of the bypass valve can be prevented. In contrast, when the surge margin is small, it is easily determined that the surging occurs. Thus, the bypass valve is easily opened, and the surging is easily prevented.

Therefore, the flow rate change amount threshold for the surging determination can be changed in accordance with the position of the operating point of the compressor relative to a surge line. Thus, while preventing the generation of the surging, unnecessary opening of the bypass valve can be prevented.

According to the sixth aspect of the present invention, the effect of the second aspect of the present invention is realized by the control device of the turbocharged engine.

According to the seventh aspect of the present invention, the effect of the third aspect of the present invention is realized by the control device of the turbocharged engine.

According to the eighth aspect of the present invention, the effect of the fourth aspect of the present invention is realized by the control device of the turbocharged engine.

To be specific, according to the control method of the turbocharged engine of the present invention, while preventing the surging, unnecessary opening of the bypass valve is prevented, and the acceleration response can be improved.

BRIEF DESCRIPTION OF THE DRAWINGS

FIG. 5 is a graph showing operations of the control system of FIG. 2.

FIG. 6 is a graph showing other operations of the control system of FIG. 2.

DESCRIPTION OF EMBODIMENTS

Hereinafter, a supercharging system of a turbocharged engine according to one embodiment of the present invention will be explained in reference to the attached drawings.

Embodiment 1

Figure 1:
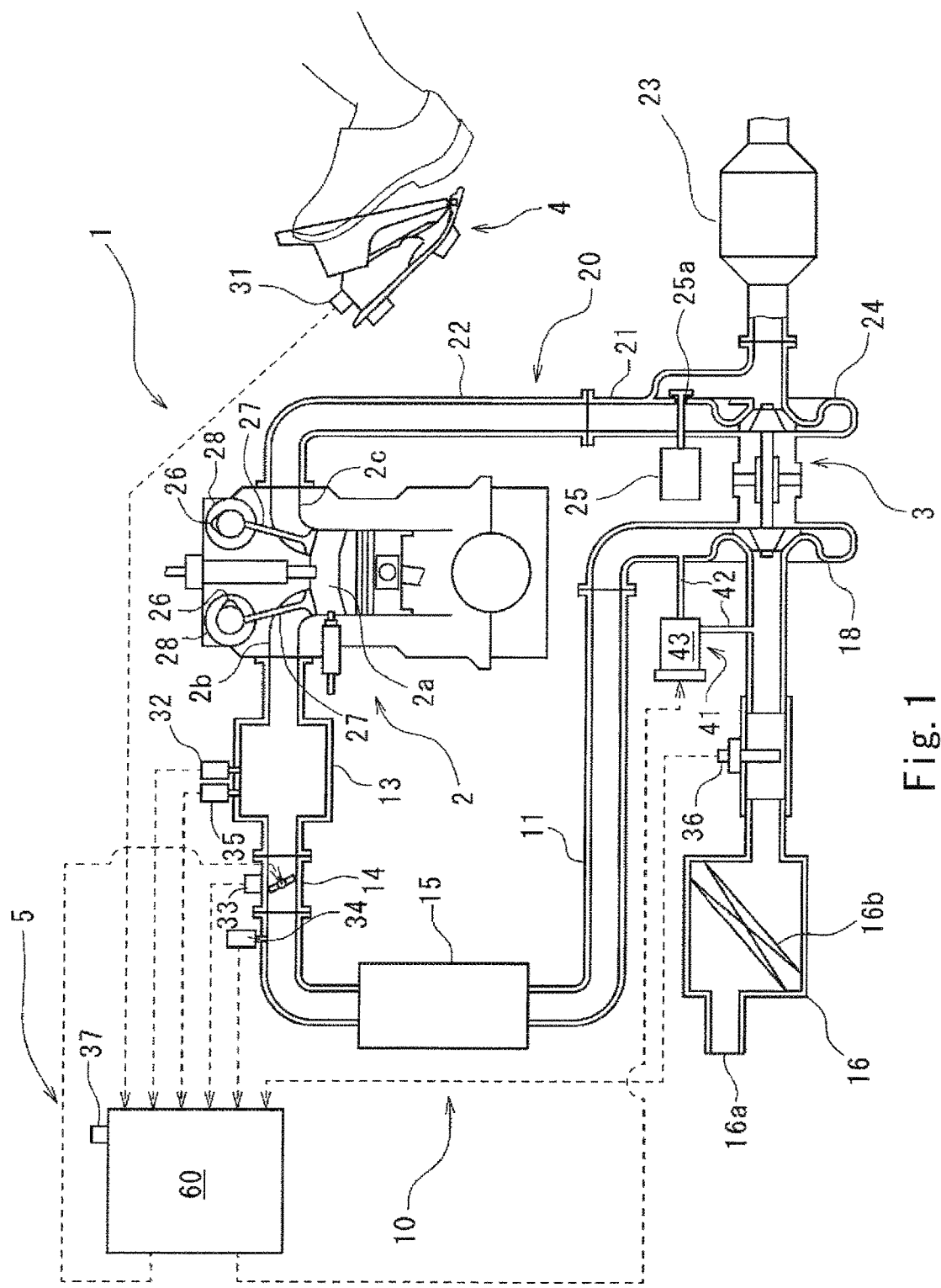
FIG. 1 is a block diagram schematically showing a supercharging system of a turbocharged engine according to one embodiment of the present invention.

The supercharging system of the turbocharged engine according to Embodiment 1 of the present invention includes: a bypass passage that is provided at an intake passage and bypasses a compressor; and a bypass valve that is disposed on the bypass passage and opens and closes the bypass passage, and surging in the intake passage when a throttle valve is closed at the time of deceleration is suppressed by opening the bypass valve. FIG. 1 is a block diagram showing a schematic configuration of a supercharging system 1 of the turbocharged engine according to Embodiment 1 of the present invention.

As shown in FIG. 1, the supercharging system 1 includes an engine 2, an intake system 10, an exhaust system 20, an accelerator pedal device 4, and a control portion 5. The engine 2 is a gasoline engine, and a camshaft 26 is provided with a VVT 28 configured to variably control a valve opening timing of an intake-exhaust valve 27 in accordance with an operation state. The intake system 10 is connected to a combustion chamber 2a of the engine 2 through an intake port 2b, and the exhaust system 20 is connected to the combustion chamber 2a of the engine 2 through an exhaust port 2c.

The intake system 10 includes an intake passage 11 and further includes an air cleaner 16, a compressor 18 of a turbocharger 3, an intercooler 15, a throttle valve 14, and an intake manifold 13, which are disposed on the intake passage 11 in this order from an upstream side. The intake system 10 supplies air, taken from outside through an air intake 16a of the air cleaner 16, to the compressor 18 through a filter 16b. The air is supercharged by the compressor 18 and is then cooled by the intercooler 15. After that, the flow rate of the air is adjusted by the throttle valve 14, and the air is supplied to the combustion chamber 2a of each cylinder through the intake manifold 13.

An air flow sensor 36 is disposed on the intake passage 11 so as to be located between the air cleaner 16 and the compressor 18. The air flow sensor 36 detects the amount of intake air taken through the air intake 16a. Examples of the air flow sensor 36 include a heat-ray type air flow sensor and a Karman's vortex type air flow sensor.

Further, a pressure sensor 34 is disposed on the intake passage 11 so as to be located between the intercooler 15 and the throttle valve 14, and an intake manifold pressure sensor 32 and a temperature sensor 35 are provided at the intake manifold 13. The pressure sensor 34 detects a pressure in the intake passage 11 extending between the intercooler 15 and the throttle valve 14. The intake manifold pressure sensor 32 detects a pressure in the intake manifold 13, and the temperature sensor 35 detects a temperature in the intake manifold 13.

The throttle valve 14 is an electronic control type valve that is opened or closed based on a control signal from the control portion 5 in accordance with a pedal stepping operation performed by a driver and detected by an accelerator pedal opening degree sensor 31 of the accelerator pedal device 4. The throttle valve 14 changes an intake passage area in the intake passage 11 to adjust the amount of air supplied to the combustion chamber 2a. A throttle valve opening degree sensor 33 configured to detect the opening degree of the throttle valve 14 is provided at the throttle valve 14.

An intake air returning device 41 is disposed on the intake passage 11 and returns a part of the intake air, supercharged by the compressor 18, to an upstream side of the compressor 18. The intake air returning device 41 includes a bypass passage 42 and a bypass valve 43.

One of ends of the bypass passage 42 is open at the intake passage 11 extending between the air flow sensor 36 and the compressor 18, and the other end thereof is open at the intake passage 11 extending between the compressor 18 and the intercooler 15. The bypass valve 43 is disposed on the bypass passage 42 and is an electronic control type valve that is opened or closed based on the control signal from the control portion 5.

The turbocharger 3 includes: the compressor 18 disposed on the intake passage 11; a turbine 24 disposed on an exhaust passage 21; and a waste gate actuator 25. In the turbocharger 3, the turbine 24 is rotated by an exhaust flow discharged from the engine 2. With this, the compressor 18 coaxially and directly coupled to the turbine 24 is rotated. As a result, supercharged intake air is supplied to the intake passage 11.

Through an exhaust bypass passage 25a that causes upstream and downstream sides of the turbine 24 to communicate with each other, the waste gate actuator 25 causes a part of the exhaust flow, discharged from the engine 2, to bypass the turbine 24 to release the part of the exhaust flow to the downstream side.

An exhaust manifold 22, the turbine 24 of the turbocharger 3, and an exhaust pipe 23 are disposed on the exhaust passage 21 in this order from the upstream side.

Figure 2:
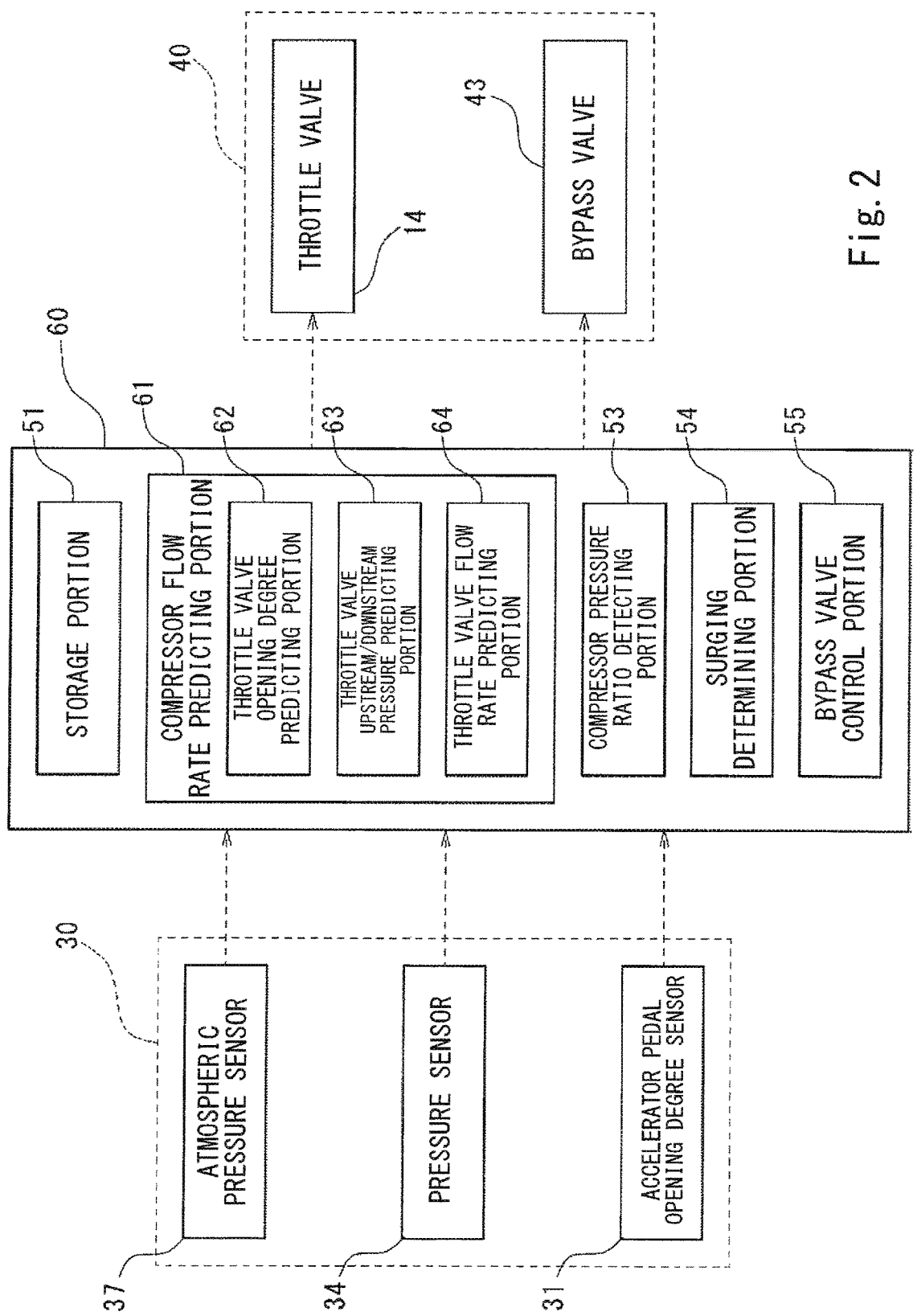
FIG. 2 is a block diagram showing a control system according to Embodiment 1.

Next, the control portion 5 will be explained in reference to the block diagram of FIG. 2. The control portion 5 includes an input device 30, a control device 60, and an output device 40. The control device 60 predicts an operation state of the compressor 18 after a predetermined time based on a signal from the input device 30 to determine whether to not the surging occurs after the predetermined time. Based on a result of the determination, the control device 60 opens or closes the bypass valve 43 serving as the output device 40.

The input device 30 includes the accelerator pedal opening degree sensor 31, the pressure sensor 34, and an atmospheric pressure sensor 37. The atmospheric pressure sensor 37 is attached to the control device 60 (see FIG. 1). The output device 40 includes the throttle valve 14 and the bypass valve 43.

The control device 60 includes a storage portion 51, a compressor flow rate predicting portion 61, a compressor pressure ratio detecting portion 53, a surging determining portion 54, and a bypass valve control portion 55. The storage portion 51 stores data necessary for controlling the bypass valve 43. For example, the storage portion 51 stores: dynamic characteristic data of the throttle valve 14; a volume efficiency predicting map that predicts a volume efficiency after a predetermined time; and a surging determination threshold (surging determination data).

The dynamic characteristic data of the throttle valve 14 is stored as time-series data of an actual opening degree of the throttle valve 14 with respect to a command of a target opening degree of the throttle valve 14 and is, for example, data obtained in advance under various operating conditions. It should be noted that the target opening degree of the throttle valve 14 is set by the control device 60 in accordance with a stepping operation performed by a driver with respect to the accelerator pedal device 4 and detected by the accelerator pedal opening degree sensor 31.

The volume efficiency predicting map is stored as map data that predicts a volume efficiency after the predetermined time based on: a predicted opening degree of the throttle valve 14 after the predetermined time; and various driving parameters (such as an engine revolution, an advance angle target value of the VVT 27, and an intake pressure of the intake manifold 13).

The surging determination threshold is used for a surging determination performed by the surging determining portion 54. The surging determination threshold is a minimum passing flow rate of the compressor 18 which rate does not cause the surging. The surging determination threshold is set for each compressor pressure ratio. It should be noted that in consideration of variations of surge lines of the individual compressors 18, the surging determination threshold may be set to a high flow rate side relative to an average surging line such that those variations are absorbed. With this, the surging determination can be performed while considering the variations of the surge lines of the individual compressors.

The compressor flow rate predicting portion 61 has a function of, based on the predicted opening degree of the throttle valve 14 after a predetermined time (for example, 30 msec), predicting the flow rate of the air flowing through the compressor 18 after the predetermined time. The compressor flow rate predicting portion 61 includes: a throttle valve opening degree predicting portion 62; a throttle valve upstream/downstream pressure predicting portion 63; and a throttle valve flow rate predicting portion 64.

The throttle valve opening degree predicting portion 62 reads out the dynamic characteristic data of the throttle valve 14 from the storage portion 51 and predicts the opening degree of the throttle valve 14 after the predetermined time with respect to a command value of the target opening degree of the throttle valve 14.

The throttle valve upstream/downstream pressure predicting portion 63 predicts a pressure upstream of the throttle valve 14 and a pressure downstream of the throttle valve 14. First, the throttle valve upstream/downstream pressure predicting portion 63 regards the pressure detected by the pressure sensor 34 as the pressure upstream of the throttle valve 14 after the predetermined time. Since the pressure upstream of the throttle valve 14 is maintained for a while by the turbine 24 that maintains its rotation for a while even at the time of deceleration by inertia, the throttle valve upstream/downstream pressure predicting portion 63 predicts a detected value of the pressure at present as the pressure after the predetermined time.

On the other hand, regarding the pressure downstream of the throttle valve 14, the throttle valve upstream/downstream pressure predicting portion 63 reads out a predicted value of the volume efficiency after the predetermined time from the volume efficiency predicting map, stored in the storage portion 51, based on the predicted opening degree of the throttle valve 14 after the predetermined time and various driving parameters (such as the engine revolution, the advance angle target value of the VVT, and the intake manifold pressure). Then, the throttle valve upstream/downstream pressure predicting portion 63 predicts the pressure downstream of the throttle valve 14 based on the amount of intake air taken into the combustion chamber 2a, the amount being calculated based on the predicted value.

The throttle valve flow rate predicting portion 64 predicts the amount of intake air, flowing through the throttle valve 14, based on the predicted opening degree of the throttle valve 14 after the predetermined time, an intake pressure upstream of the throttle valve 14 after the predetermined time, and an intake pressure downstream of the throttle valve 14 after the predetermined time from, for example Bernoulli's theorem. Then, the throttle valve flow rate predicting portion 64 regards the predicted amount as the amount of intake air flowing through the compressor 18 after the predetermined time.

The compressor pressure ratio detecting portion 53 regards an atmospheric pressure, detected by the atmospheric pressure sensor 37, as the pressure upstream of the compressor 18 and calculates the compressor pressure ratio based on the pressure upstream of the compressor 18 and the pressure downstream of the compressor 18 which pressure is detected by the pressure sensor 34. As described above, since the intake pressure upstream of the throttle valve 14 is maintained for a while even when the throttle valve 14 is closed, the compressor pressure ratio detecting portion 53 regards the detected compressor pressure ratio at present as the compressor pressure ratio after the predetermined time.

It should be noted that as the pressure upstream of the compressor 18, a pressure detected by a pressure sensor provided between the compressor 18 and the air cleaner 16 may be adopted instead of the detected value of the atmospheric pressure sensor 37. Similarly, as the pressure downstream of the compressor 18, a pressure detected by a pressure sensor provided between the compressor 18 and the intercooler 15 instead of the pressure sensor 34 may be adopted. With this, the compressor pressure ratio can be detected more accurately.

The surging determining portion 54 reads out from the storage portion 51 the surging determination threshold with respect to the compressor pressure ratio after the predetermined time, compares the threshold with a compressor predicted flow rate after the predetermined time, determines whether or not the surging occurs after the predetermined time, and starts up the bypass valve control portion 55.

Specifically, when the compressor predicted flow rate is lower than the surging determination threshold, it is determined that the surging occurs, and when the compressor predicted flow rate is higher than the surging determination threshold, it is determined that the surging does not occur.

The bypass valve control portion 55 opens the bypass valve 43 when the surging determining portion 54 determines that the surging occurs and closes the bypass valve 43 when the surging determining portion 54 determines that the surging does not occur.

Figure 3:
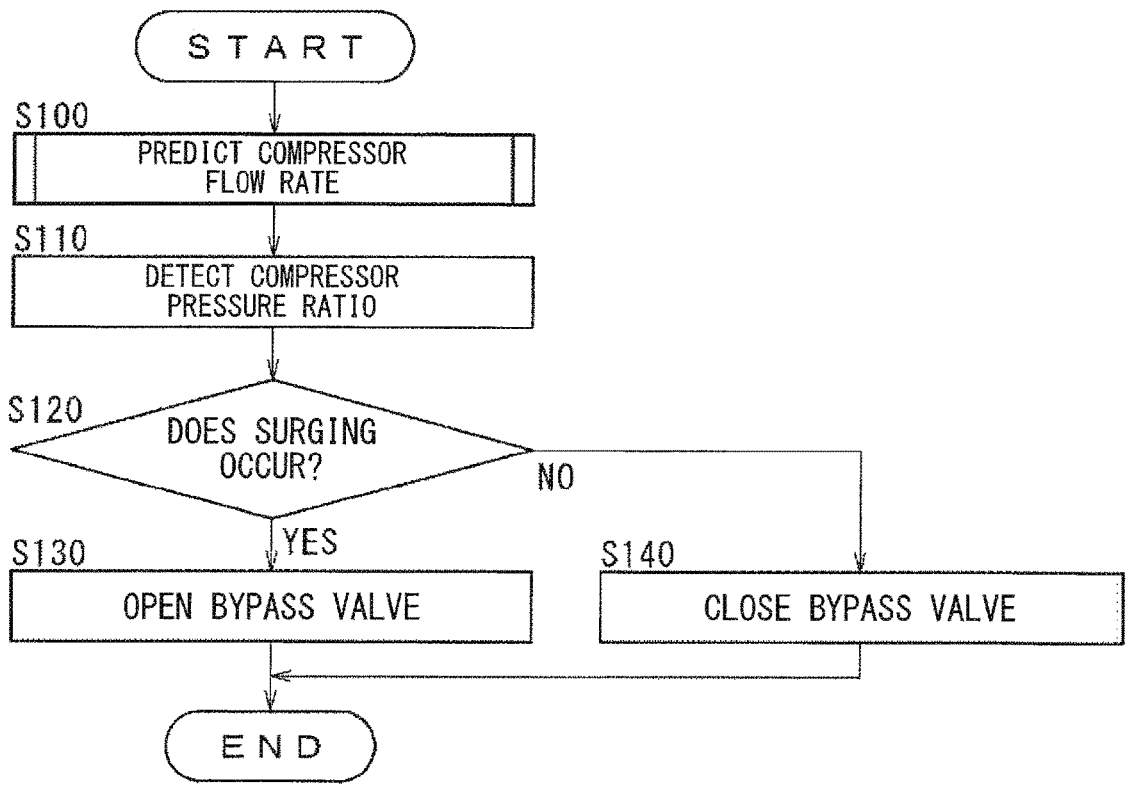
FIG. 3 is a flow chart showing operations of the control system of FIG. 2.
Figure 4:
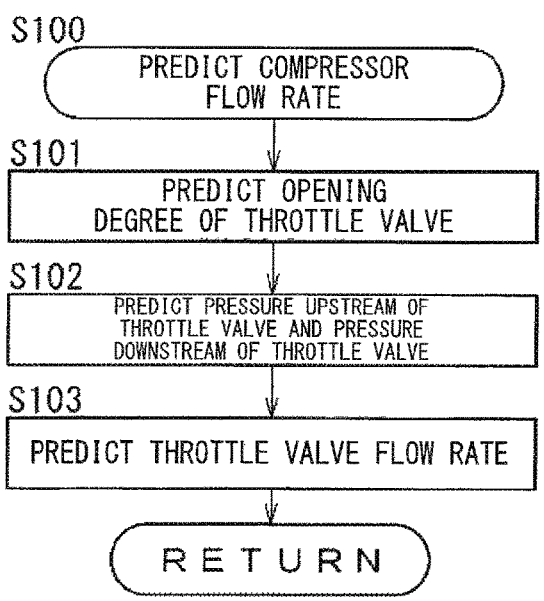
FIG. 4 is a flow chart showing a subroutine for predicting a flow rate of air flowing through a compressor.

Next, the operations of the control device 60 when controlling the bypass valve 43 will be explained in reference to FIGS. 3 and 4. FIG. 3 is a flow chart showing the operations of the control device 60 when controlling the bypass valve 43. FIG. 4 is a subroutine showing the operations of the compressor flow rate predicting portion 61 when predicting the flow rate of the air flowing through the compressor 18 after the predetermined time.

As shown in FIG. 3, first, as a compressor flow rate predicting step, the compressor flow rate predicting portion 61 is started up, and the flow rate of the air flowing through the compressor 18 after the predetermined time is predicted (Step S100).

As shown in FIG. 4, as a throttle valve opening degree predicting step, the compressor flow rate predicting portion 61 first starts up the throttle valve opening degree predicting portion 62 and predicts the opening degree of the throttle valve 14 after the predetermined time (Step S101). Next, as a throttle valve upstream/downstream pressure predicting step, the compressor flow rate predicting portion 61 starts up the throttle valve upstream/downstream pressure predicting portion 63 and predicts the pressure upstream of the throttle valve 14 after the predetermined time and the pressure downstream of the throttle valve 14 after the predetermined time (Step S102). Finally, as a throttle valve flow rate predicting step, the throttle valve flow rate predicting portion 64 is started up, the flow rate of the air flowing through the throttle valve 14 after the predetermined time is predicted, and the predicted flow rate is regarded as the flow rate of the air flowing through the compressor 18 after the predetermined time (Step S103).

Referring back to FIG. 3, next, as a compressor pressure ratio detecting step, the compressor pressure ratio detecting portion 53 is started up, a pressure ratio between the pressure upstream of the compressor 18 and the pressure downstream of the compressor 18 is detected, and this compressor pressure ratio is regarded as the compressor pressure ratio after the predetermined time (Step S110).

Next, as a surging determining step, the surging determining portion 54 is started up, and the surging determination is performed based on the compressor predicted flow rate after the predetermined time and the compressor pressure ratio in reference to the surging determination threshold stored in the storage portion 51 (Step S120).

As a bypass valve controlling step, when the surging determining portion 54 determines that the surging occurs, the bypass valve control portion 55 opens the bypass valve 43 (Step S130). With this, the pressure between the compressor 18 and the throttle valve 14 is released through the bypass passage 42 to the upstream side of the compressor 18.

In contrast, when the surging determining portion 54 determines that the surging does not occur, the bypass valve control portion 55 closes the bypass valve 43 (Step S140). As a result, the bypass passage 42 is not opened, so that the pressure between the compressor 18 and the throttle valve 14 is not released but maintained.

According to the control device 60 configured as above, the following effects can be obtained.

Whether or not the surging occurs after the predetermined time can be determined based on the compressor predicted flow rate after the predetermined time and the compressor pressure ratio after the predetermined time. With this, while preventing the surging, unnecessary opening of the bypass valve is prevented, and the supercharging pressure is easily maintained. To be specific, both preventing the surging and improving the acceleration response can be realized.

For example, as shown in FIG. 5A, when an operating point P3 is plotted in a supercharging region close to the surging line L on the compressor map at a time t1 at which the deceleration starts, an interval between the operating point P3 and the surging line L is short, so that the operating point P3 easily reaches the surging region only by a slight decrease in a compressor passing flow rate after the predetermined time. To be specific, in this case, the surging determining portion 54 tends to determine that the surging occurs after the predetermined time.

In this case, as shown by solid lines in FIGS. 5B and 5C, the surging is prevented by opening the bypass valve 43 at the time t1. If the bypass valve 43 is not opened, the surging occurs as shown by broken lines in FIGS. 5B and 5C.

On the other hand, as shown in FIG. 6A, when an operating point P4 of the compressor 18 before the deceleration is plotted in a supercharging region away from the surging line L on the compressor map, an interval between the operating point P4 and the surging line L is long, so that the operating point P4 hardly reaches the surging region even by a slight decrease in the compressor passing flow rate after the predetermined time. To be specific, in this case, the surging determining portion 54 hardly determines at the time of the deceleration that the surging occurs after the predetermined time.

In this case, as shown by solid lines in FIGS. 6B and 6C, at the time t1 at which the deceleration starts, it is hardly determined that the surging occurs after the predetermined time. Therefore, the supercharging pressure tends to be maintained until the reacceleration is performed at a time t2. Thus, the acceleration response can be improved. As shown by broken lines in FIGS. 6B and 6C, if the bypass valve 43 is opened at the time t1 at which the deceleration starts, the supercharging pressure decreases. Therefore, at the time of the reacceleration at the time t2, a time is required to increase the supercharging pressure. Thus, the acceleration response deteriorates.

Further, a throttle valve predicted flow rate which is calculated based on the predicted opening degree of the throttle valve 14 after the predetermined time, the pressure upstream of the throttle valve 14 after the predetermined time, and the pressure downstream of the throttle valve 14 after the predetermined time is regarded as the flow rate of the air flowing through the compressor 18 after the predetermined time. With this, the flow rate of the air flowing through the compressor 18 after the predetermined time can be easily predicted with a high degree of accuracy.

Embodiment 2

Figure 7:
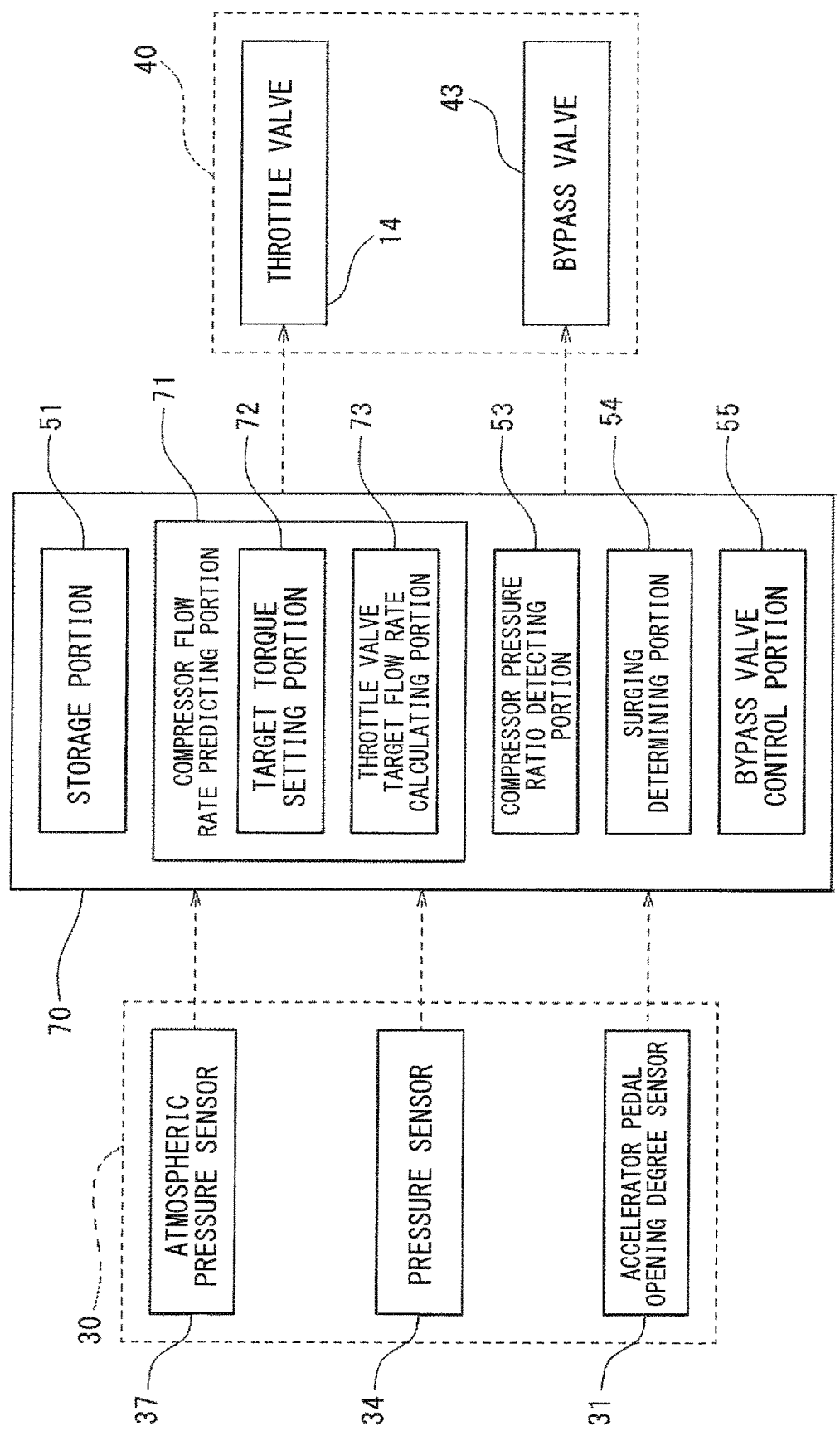
FIG. 7 is a block diagram showing the control system according to Embodiment 2.

The supercharging system of the turbocharged engine according to Embodiment 2 is different from that according to Embodiment 1 in that a control device 70 is included instead of the control device 60. As shown in FIG. 7, the control device 70 performs the surging determination based on the input signals from the input device 30 and opens or closes the bypass valve 43 serving as the output device 40.

The control device 70 includes a compressor flow rate predicting portion 71 that is different from the compressor flow rate predicting portion 61 of the control device 60, and the other components of the control device 70 are the same as those of Embodiment 1. To be specific, the control device 70 includes the storage portion 51, the compressor pressure ratio detecting portion 53, the surging determining portion 54, and the bypass valve control portion 55.

Based on a target torque set in accordance with the pedal stepping operation performed by the driver with respect to the accelerator pedal device 4, the compressor flow rate predicting portion 71 predicts the flow rate of the air flowing through the compressor 18 after the predetermined time (for example, 30 msec). The compressor flow rate predicting portion 71 includes a target torque setting portion 72 and a throttle valve target flow rate calculating portion 73.

The target torque setting portion 72 sets the target torque of the engine based on requested acceleration detected from the stepping operation performed by the driver with respect to the accelerator pedal device 4. To realize the target torque, the throttle valve target flow rate calculating portion 73 calculates a target flow rate of the air flowing through the throttle valve 14, from various driving parameters (such as a cylinder average effective pressure, a heat efficiency, the amount of heat generated, a filling efficiency, and the engine revolution). Then, a throttle valve target flow rate that is the target flow rate calculated by the throttle valve target flow rate calculating portion 73 is regarded as the flow rate of the air flowing through the compressor 18 after the predetermined time.

Based on the compressor predicted flow rate after the predetermined time which rate is predicted by the compressor flow rate predicting portion 71 and the compressor pressure ratio after the predetermined time which ratio is detected by the compressor pressure ratio detecting portion 53, the control device 70 performs the surging determination in reference to the surging determination threshold read out from the storage portion 51. Based on the result of the determination, the control device 70 causes the bypass valve control portion 55 to open or close the bypass valve 43.

Figure 8:
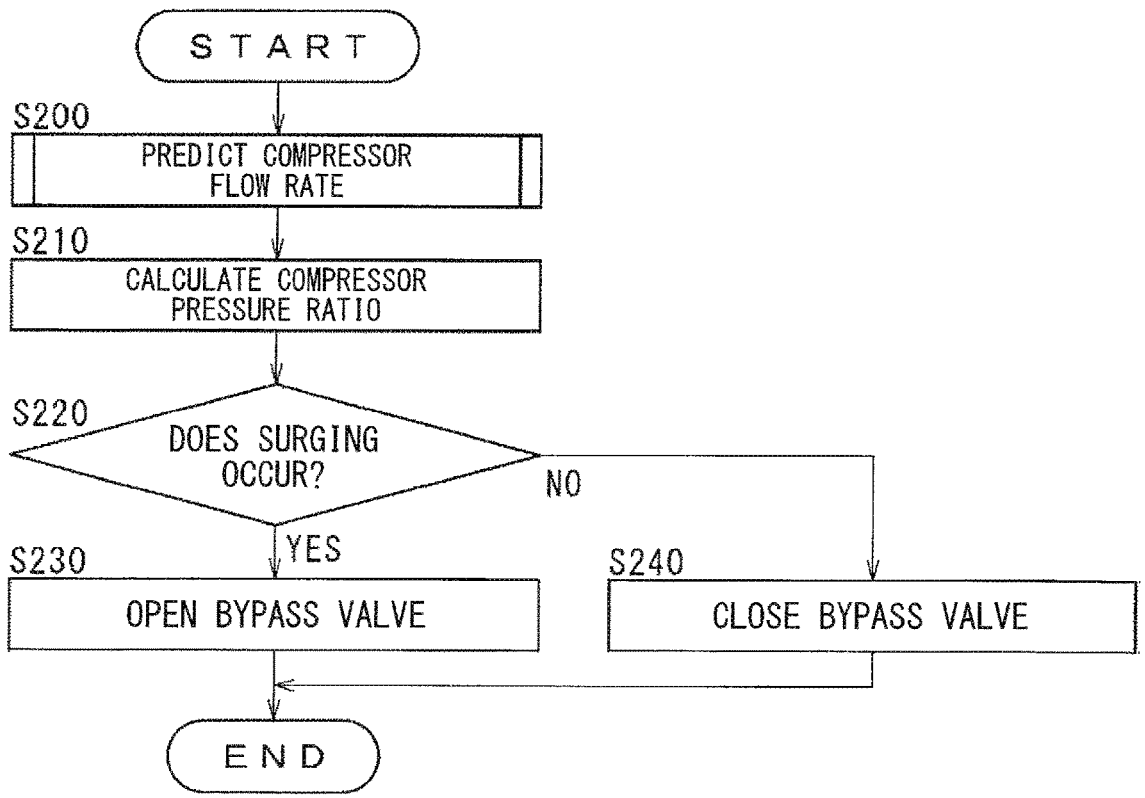
FIG. 8 is a flow chart showing operations of the control system of FIG. 7.
Figure 9:
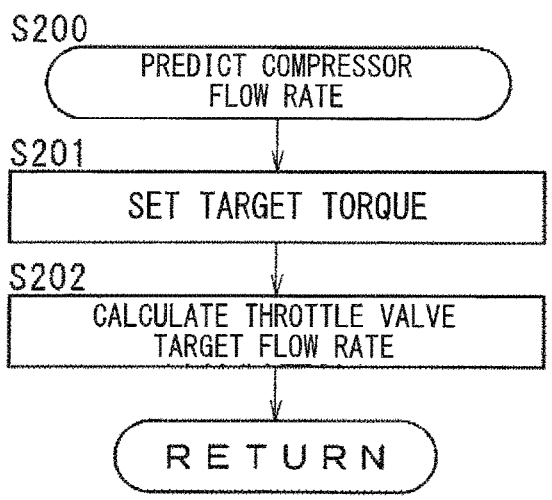
FIG. 9 is a flow chart showing a subroutine for predicting the flow rate of air flowing through the compressor.

Next, the operations of the control device 70 will be explained in reference to FIGS. 8 and 9. FIG. 8 is a flow chart showing the operations of the control device 70. FIG. 9 is a subroutine showing the operations of the compressor flow rate predicting portion 71.

As shown in FIG. 8, first, as the compressor flow rate predicting step, the compressor flow rate predicting portion 71 is started up, and the flow rate of the air flowing through the compressor 18 after the predetermined time is predicted (Step S200).

As shown in FIG. 9, as a target torque setting step, the compressor flow rate predicting portion 71 first starts up the target torque setting portion 72 and sets the target torque from the requested acceleration that is based on the pedal stepping operation performed by the driver with respect to the accelerator pedal device 4 (Step S201). Next, as a throttle valve target flow rate calculating step, the throttle valve target flow rate calculating portion 73 is started up, the target flow rate of the air flowing through the throttle valve 14 is calculated based on the target torque, and the target flow rate is regarded as the compressor predicted flow rate of the air flowing through the compressor 18 after the predetermined time (Step S202).

Referring back to FIG. 8, the subsequent operations are the same as Steps S110 to S140 of the control device 60 of Embodiment 1. As the compressor pressure ratio detecting step, the compressor pressure ratio after the predetermined time is detected by the compressor pressure ratio detecting portion 53 (Step S210), and as the surging determining step, the surging determination is performed by the surging determining portion 54 based on the compressor predicted flow rate after the predetermined time and the compressor pressure ratio (Step S220). As the bypass valve controlling step, the bypass valve control portion 55 opens the bypass valve 43 when it is determined that the surging occurs (Step S230) and closes the bypass valve 43 when it is determined that the surging does not occur (Step S240).

According to the control device 70 configured as above, the following effects can be obtained.

The operation state of the compressor after the predetermined time is predicted based on the pedal stepping operation input to the accelerator pedal device 4, and as with Embodiment 1, whether or not the surging occurs after the predetermined time can be determined. Further, the surging determination immediately based on the intention of the driver can be performed in such a manner that the throttle valve target flow rate calculated based on an acceleration request from the driver is regarded as the compressor predicted flow rate.

To be specific, for example, in consideration of actual operation delays of the throttle valve 14 and the like, the target flow rate of the throttle valve 14 with respect to the target opening degree of the throttle valve 14 can be regarded as the flow rate of the air flowing through the throttle valve 14 after a time corresponding to the operation delays. With this, the operating point of the compressor 18 after the predetermined time can be predicted with a high degree of accuracy, so that the surging determination after the predetermined time can be suitably performed.

Embodiment 3

Figure 10:
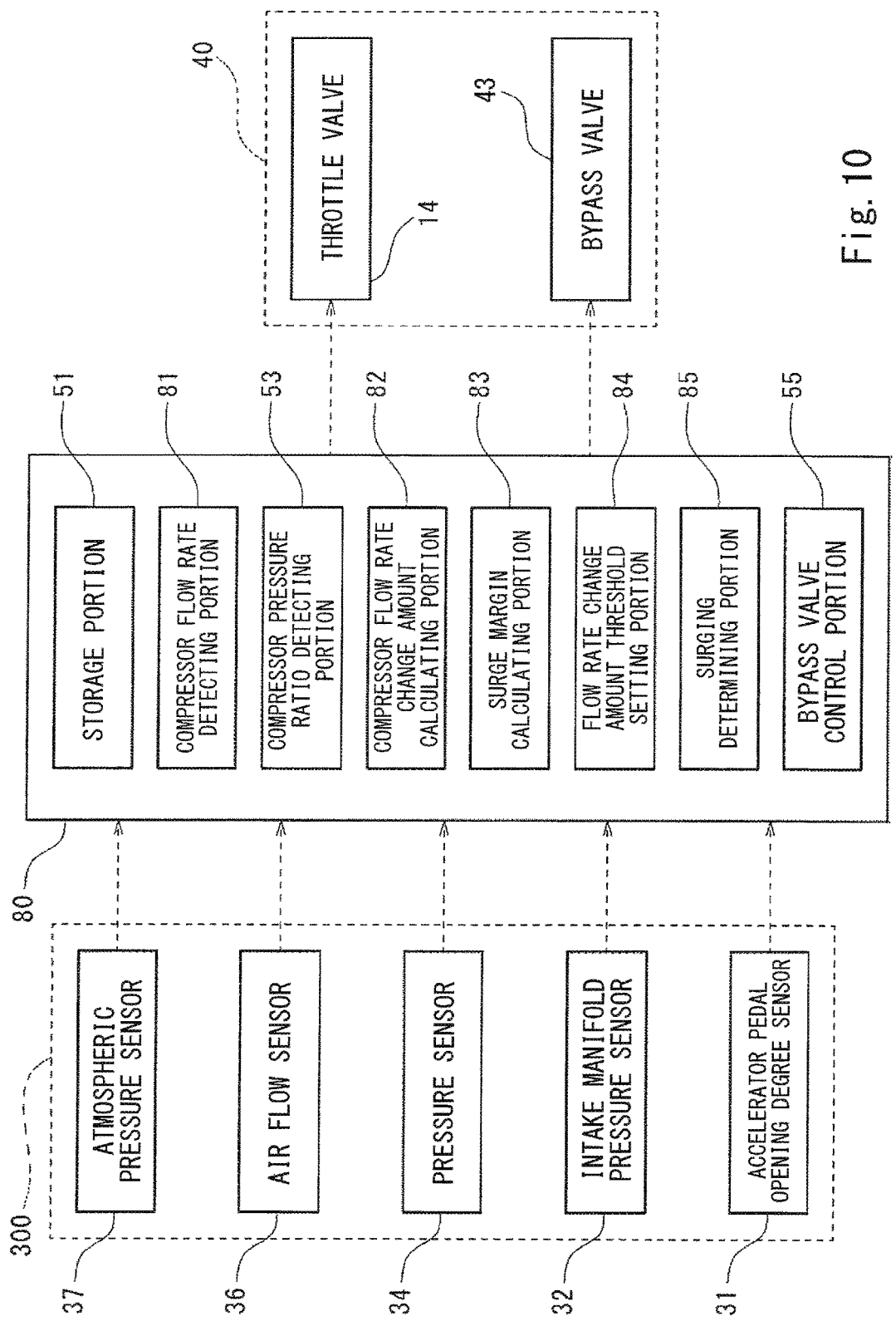
FIG. 10 is a block diagram showing the control system according to Embodiment 3.

The supercharging system of the turbocharged engine according to Embodiment 3 is different from that according to Embodiment 1 in that: an input device 300 is included instead of the input device 30; and a control device 80 is included instead of the control device 60. As shown in FIG. 10, the control device 80 calculates a surge margin based on the input signals from the input device 300, performs based on the surge margin the surging determination regarding whether or not the surging occurs after the predetermined time, and based on the result of the determination, opens or closes the bypass valve 43 serving as the output device 40.

The input device 300 includes the atmospheric pressure sensor 37, the intake manifold pressure sensor 32, the pressure sensor 34, the air flow sensor 36, and the accelerator pedal opening degree sensor 31.

The control device 80 includes the storage portion 51, a compressor flow rate detecting portion 81, the compressor pressure ratio detecting portion 53, a compressor flow rate change amount calculating portion 82, a surge margin calculating portion 83, a change amount threshold setting portion 84, a surging determining portion 85, and the bypass valve control portion 55. Since the storage portion 51, the compressor pressure ratio detecting portion 53, and the bypass valve control portion 55 are the same as those of Embodiment 1, explanations thereof are omitted.

From the amount of intake air detected by the air flow sensor 36, the compressor flow rate detecting portion 81 detects the flow rate of the air flowing through the compressor. The compressor flow rate change amount calculating portion 82 calculates a change amount per time of the compressor passing flow rate detected by the compressor flow rate detecting portion 81.

The surge margin calculating portion 83 calculates as the surge margin an interval between the compressor detected flow rate and the surging determination threshold read out from the storage portion 51, at the compressor pressure ratio detected by the compressor pressure ratio detecting portion 53. The change amount threshold setting portion 84 sets a flow rate change amount threshold in accordance with the surge margin. Specifically, the flow rate change amount threshold is set so as to increase as the surge margin increases.

The surging determining portion 85 determines based on the flow rate change amount and the flow rate change amount threshold whether or not the surging occurs after the predetermined time. Specifically, when it is predicted from the surge margin and the flow rate change amount that the surge margin after the predetermined time becomes a negative value, it is determined that the surging occurs, and when it is predicted that the surge margin becomes a positive value, it is determined that the surging does not occur. Next, based on the result of the determination by the surging determining portion 85, the bypass valve 43 is opened or closed by the bypass valve control portion 55.

Figure 11:
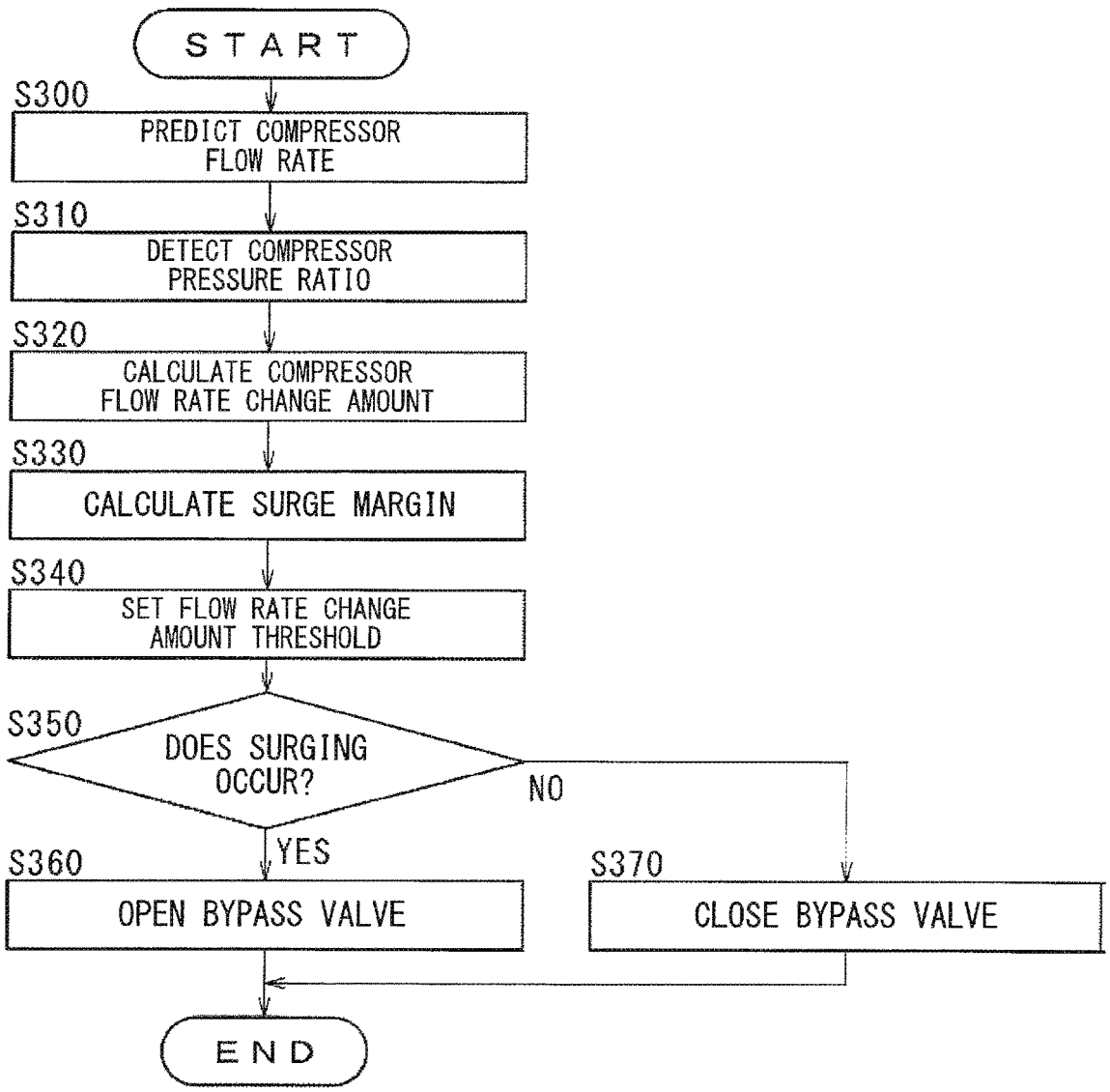
FIG. 11 is a flow chart showing operations of the control system of FIG. 10.

Next, the operations in Embodiment 3 will be explained in reference to FIG. 11. FIG. 11 is a flow chart showing the operations of the control device 80. As shown in FIG. 11, first, as a compressor flow rate detecting step, the flow rate of the air flowing through the compressor is detected by the compressor flow rate detecting portion 81 (Step S300). Next, as the compressor pressure ratio detecting step, the compressor pressure ratio is detected by the compressor pressure ratio detecting portion 53 (Step S310). Next, as a compressor flow rate change amount calculating step, the change amount per time of the compressor passing flow rate is calculated by the compressor flow rate change amount calculating portion 82 (Step S320).

Next, as a surge margin calculating step, the surge margin is calculated by the surge margin calculating portion 83 (Step S330). Next, as a change amount threshold setting step, the flow rate change amount threshold is set by the change amount threshold setting portion 84 (Step S340). Next, as the surging determining step, whether or not the surging occurs after the predetermined time is determined by the surging determining portion 85 (Step S350).

When it is determined in Step S350 that the surging occurs, as the bypass valve controlling step, the bypass valve 43 is opened by the bypass valve control portion 55 (Step S360). When it is determined in Step S350 that the surging does not occur, the bypass valve 43 is closed by the bypass valve control portion 55 (Step S370).

According to the control device 80 configured as above, the following effects can be obtained.

Without predicting the flow rate of the air flowing through the compressor 18, the surging determination can be performed based on the surge margin and the flow rate change amount which are calculated from the operation state of the compressor 18 at present.

The flow rate change amount threshold is set so as to increase as the surge margin increases. With this, when the surge margin is large, the flow rate change amount threshold is set to be high, so that it is hardly determined that the surging occurs. Thus, unnecessary opening of the bypass valve 43 can be prevented. In contrast, when the surge margin is small, the flow rate change amount threshold is set to be low, so that it is easily determined that the surging occurs. Thus, the bypass valve 43 is easily opened, and the surging is easily prevented. With this, unnecessary opening of the bypass valve 43 can be prevented while preventing the generation of the surging.

Figure 12A:
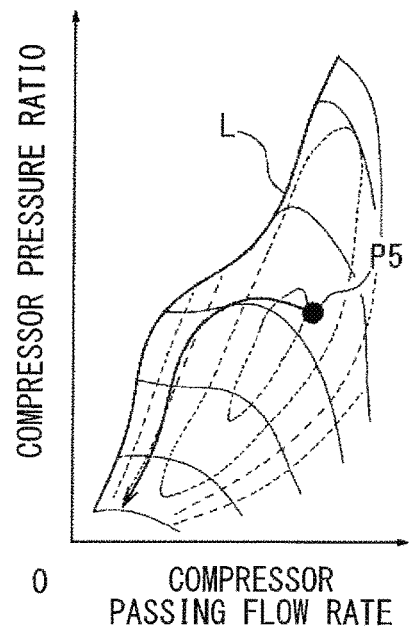
FIG. 12 is a graph showing operations of the control system of FIG. 10.
Figure 12B:
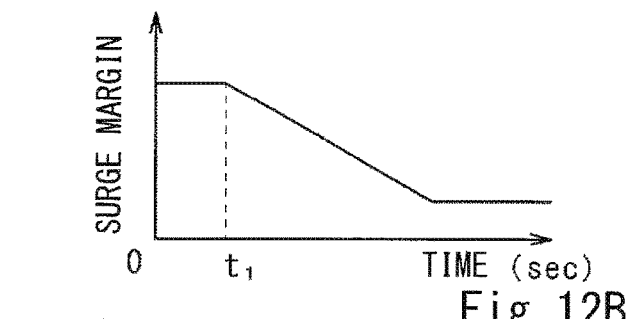
Figure 12C:
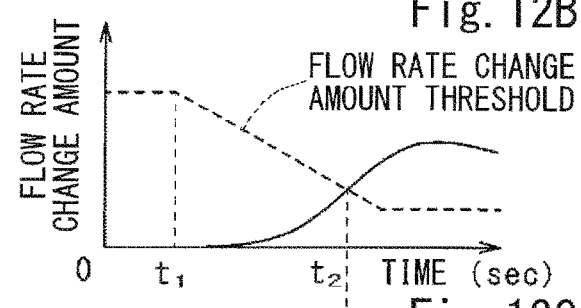
Figure 12D:
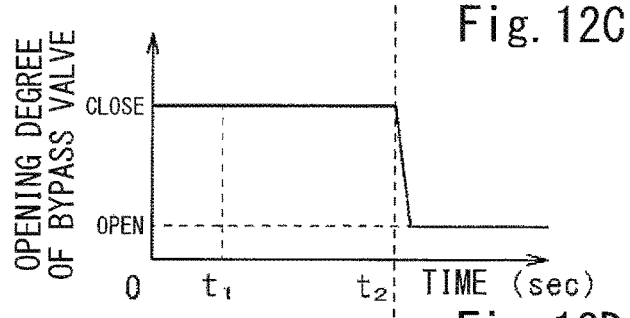
Figure 12E:
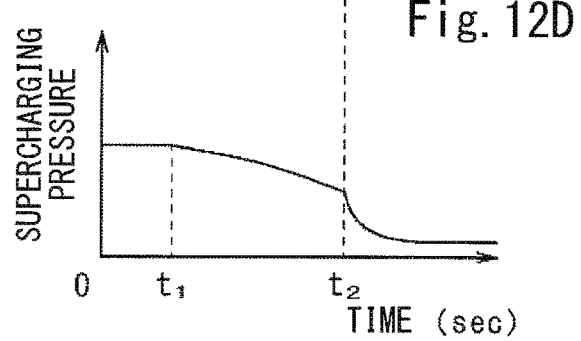
Figure 13:
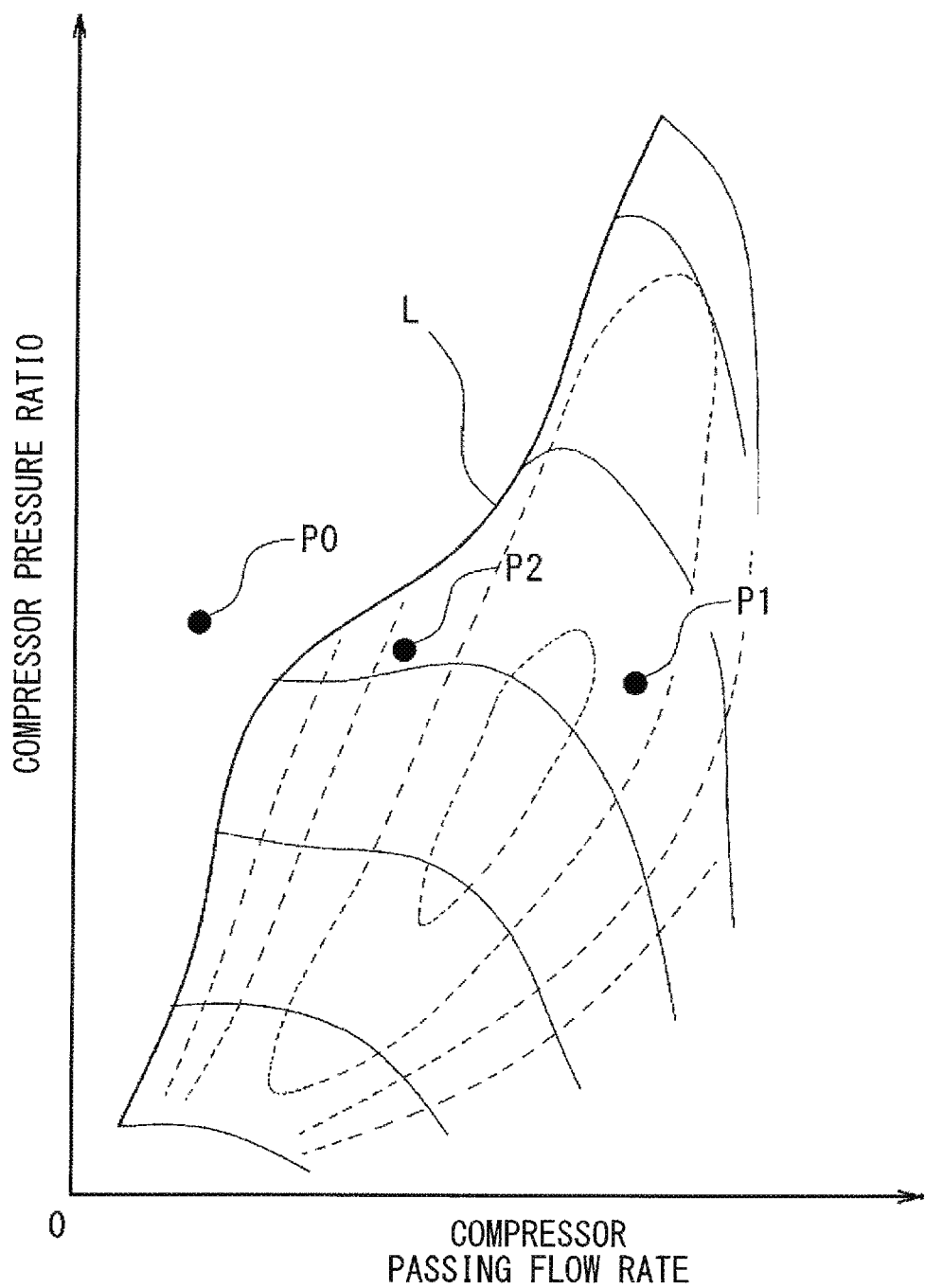
FIG. 13 is a schematic diagram of a compressor map.

FIGS. 12A to 12E show transitions of various data when the deceleration is performed at the time t1. The transition of an operating point P5 of the compressor is shown in FIG. 12A. The transition of the surge margin is shown in FIG. 12B. The flow rate change amount threshold for the surging determination is shown by a dotted line in FIG. 12C, and the transition of the flow rate change amount is shown by a solid line in FIG. 12C. The transition of the operation of the bypass valve is shown in FIG. 12D. The transition of the supercharging pressure is shown in FIG. 12E.

As shown in FIG. 12A, at the time t1 at which the deceleration starts, the operating point P5 of the compressor is located at a position away from the surging line L. Therefore, the surge margin is large as shown in FIG. 12B, and the flow rate change amount threshold is set to be low as shown by the dotted line in FIG. 12C. When the deceleration is performed from this state, as shown in FIG. 12A, the operating point P5 of the compressor 18 moves to the low flow rate side while maintaining the pressure ratio. Therefore, the surge margin decreases as shown in FIG. 12B.

Then, as shown in FIG. 12C, as the surge margin decreases, the flow rate change amount threshold also decreases. On the other hand, when the flow rate change amount by the deceleration increases to be larger than the flow rate change amount threshold at the time t2, the bypass valve 43 is opened as shown in FIG. 12D, and the supercharging pressure between the compressor 18 and the throttle valve 14 decreases as shown in FIG. 12E. In this way, while preventing the generation of the surging, unnecessary opening of the bypass valve 43 is prevented, and the supercharging pressure tends to be maintained.

The present invention is not limited to the above embodiments. Needless to say, various improvements and design modifications may be made within the scope of the present invention.

INDUSTRIAL APPLICABILITY

As described above, according to the present invention, the acceleration response can be improved while preventing the surging. Therefore, the present invention may be suitably used in a technical field of production of this type of turbocharged engine.

LIST OF REFERENCE CHARACTERS 1 supercharging system
2 engine
3 turbocharger
4 accelerator pedal device
5 control portion
13 intake manifold
14 throttle valve
15 intercooler
16 air cleaner
18 compressor
24 turbine
31 accelerator pedal opening degree sensor
32 intake manifold pressure sensor
34 pressure sensor
36 air flow sensor
37 atmospheric pressure sensor
42 bypass passage
43 bypass valve
51 storage portion
53 compressor pressure ratio detecting portion
54 surging determining portion
55 bypass valve control portion
60 control device
61 compressor flow rate predicting portion

The invention claimed is:

1. A method of controlling a turbocharged engine, the turbocharged engine comprising:
   a turbocharger including a compressor disposed on an intake passage;
   a bypass passage connecting a portion of the intake passage which portion is located upstream of the compressor and a portion of the intake passage which portion is located downstream of the compressor; and
   a bypass valve disposed on the bypass passage and configured to open and close the bypass passage,
   the method comprising:
   a compressor flow rate predicting step of predicting an opening degree of a throttle valve after a predetermined time, from a target opening degree of the throttle valve which degree is set in accordance with an acceleration request from a driver and then predicting a flow rate of air flowing through the compressor after the predetermined time based on the predicted opening degree of the throttle valve after the predetermined time, wherein the compressor flow rate predicting step includes:
      a throttle valve opening degree predicting step of predicting the opening degree of the throttle valve after the predetermined time, from the target opening degree of the throttle valve which degree is set in accordance with the acceleration request from the driver,
      a throttle valve upstream/downstream pressure predicting step of predicting a pressure upstream of the throttle valve after the predetermined time and a pressure downstream of the throttle valve after the predetermined time, and
      a throttle valve flow rate predicting step of predicting the flow rate of the air flowing through the throttle valve after the predetermined time, based on a throttle valve predicted opening degree that is the opening degree predicted in the throttle valve opening degree predicting step and throttle valve upstream/downstream predicted pressures that are the pressures predicted in the throttle valve upstream/downstream pressure predicting step;
   a compressor pressure ratio detecting step of detecting a pressure ratio between a pressure upstream of the compressor and a pressure downstream of the compressor;
   a surging determining step of determining whether or not surging occurs after the predetermined time, in reference to preliminary prepared surging determination data based on a compressor predicted flow rate that is the flow rate predicted in the compressor flow rate predicting step and a compressor pressure ratio that is the pressure ratio detected in the compressor pressure ratio detecting step, wherein a throttle valve predicted flow rate that is the flow rate predicted in the throttle valve flow rate predicting step is regarded as the compressor predicted flow rate; and
   a bypass valve controlling step of opening the bypass valve when it is determined in the surging determining step that the surging occurs and closing the bypass valve when it is determined in the surging determining step that the surging does not occur.

2. A method of controlling a turbocharged engine,
   the turbocharged engine comprising:
   a turbocharger including a compressor disposed on an intake passage;
   a bypass passage connecting a portion of the intake passage which portion is located upstream of the compressor and a portion of the intake passage which portion is located downstream of the compressor; and
   a bypass valve disposed on the bypass passage and configured to open and close the bypass passage,
   the method comprising:
   a compressor flow rate detecting step of detecting a flow rate of air flowing through the compressor;
   a compressor pressure ratio detecting step of detecting a pressure ratio between a pressure upstream of the compressor and a pressure downstream of the compressor;
   a flow rate change amount calculating step of calculating a change amount of a compressor flow rate that is the flow rate detected in the compressor flow rate detecting step;
   a surge margin calculating step of calculating a surge margin in reference to preliminary prepared surging determination data based on the compressor flow rate and a compressor pressure ratio that is the pressure ratio detected in the compressor pressure ratio detecting step;
   a surging determining step of determining whether or not surging occurs after a predetermined time, based on a compressor flow rate change amount that is the change amount calculated in the flow rate change amount calculating step and the surge margin calculated in the surge margin calculating step; and
   a bypass valve controlling step of opening the bypass valve when it is determined in the surging determining step that the surging occurs and closing the bypass valve when it is determined in the surging determining step that the surging does not occur.

3. The method according to claim 2, wherein when the compressor flow rate change amount exceeds a flow rate change amount threshold that is set so as to increase as the surge margin increases, it is determined in the surging determining step that the surging occurs.

* * * * *